United States Patent [19]
Keller

[11] 3,800,902
[45] Apr. 2, 1974

[54] METHOD AND APPARATUS FOR THE CONTROL OF SELF-PROPELLED APPARATUS

[76] Inventor: Richard E. Keller, 1645 Valley Ct., Township of Wash., N.J. 07675

[22] Filed: Sept. 26, 1972

[21] Appl. No.: 292,447

[52] U.S. Cl. ............................. 180/79.1, 56/10.5
[51] Int. Cl. ............................................. B62d 5/00
[58] Field of Search ........ 56/DIG. 15, 10.5; 180/79, 180/79.1

[56] References Cited
UNITED STATES PATENTS

| | | | |
|---|---|---|---|
| 2,751,030 | 6/1956 | Null | 180/79.1 |
| 3,235,024 | 2/1966 | Barrett | 180/79.1 |
| 3,472,333 | 10/1969 | Loewenstern | 180/79.1 X |
| 3,550,714 | 12/1970 | Bellinger | 180/79.1 |

Primary Examiner—Richard A. Schacher
Attorney, Agent, or Firm—Ralph R. Roberts

[57] ABSTRACT

This invention pertains to a radio-actuated, remote control apparatus and method for the functional operation of self-propelled apparatus such as lawn mowers, snow blowers and like equipment. The remote control of the desired operational functions such as turning, stopping and the like in the present invention is applied to three embodiments in which a non-powered wheel steers the machine. This wheel in the turning function is swung to a determined degree from a normal condition providing for straight ahead movement during which the axis of the wheel is parallel to the axis of the powered wheel or wheels rotated by a coupled motor means. In its straight forward motion this wheel, which may be a caster wheel, is allowed to freely swing around its vertical support axis until a turn signal is actuated and the caster wheel is swung around this axis to a determined turn angle condition. This determined turn angle is maintained during the actuation of the turn signal.

40 Claims, 19 Drawing Figures

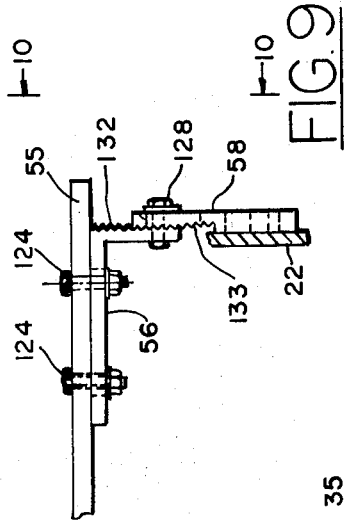
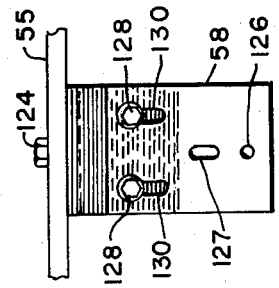
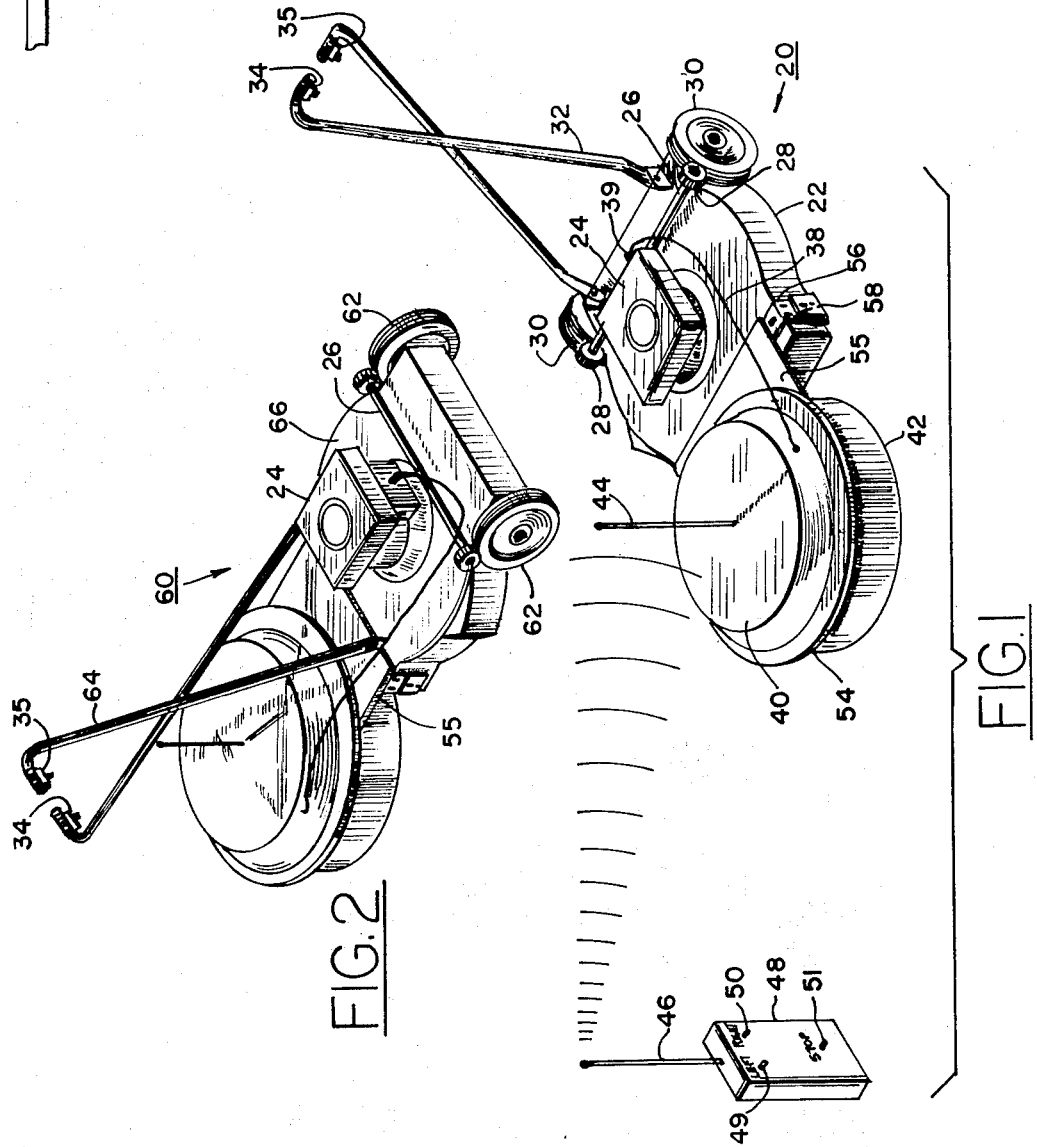

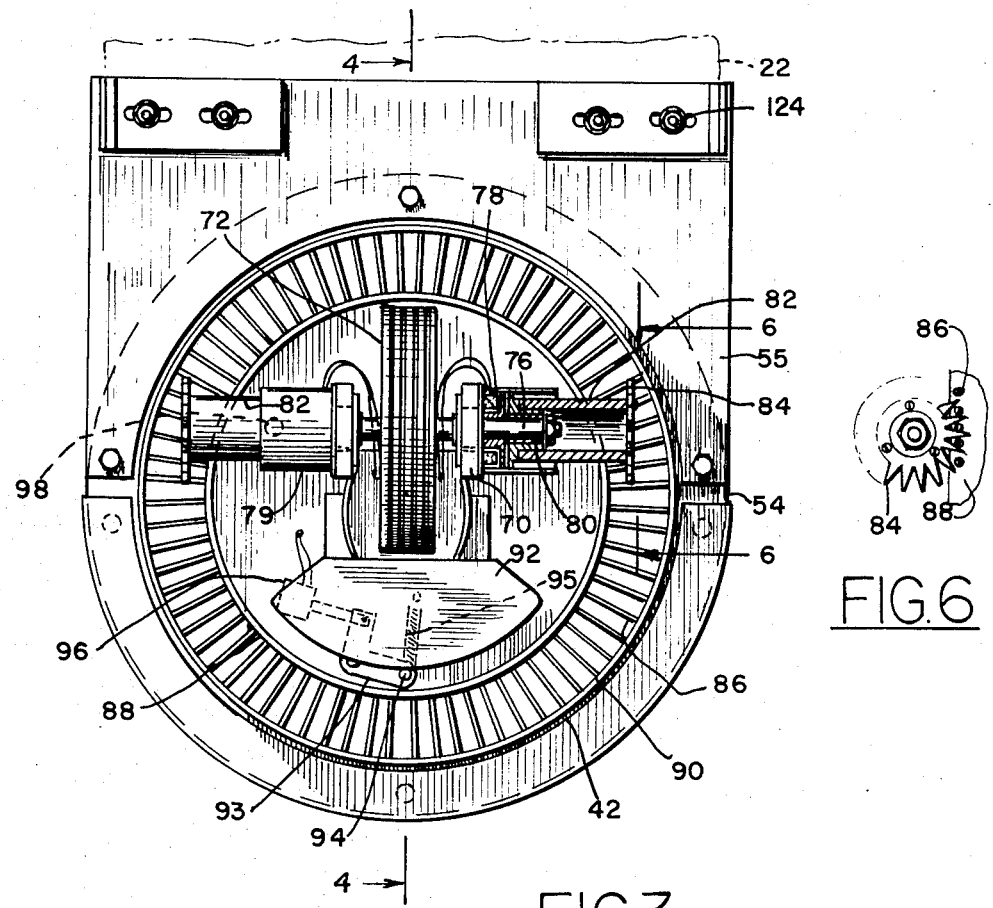
FIG.3
FIG.6
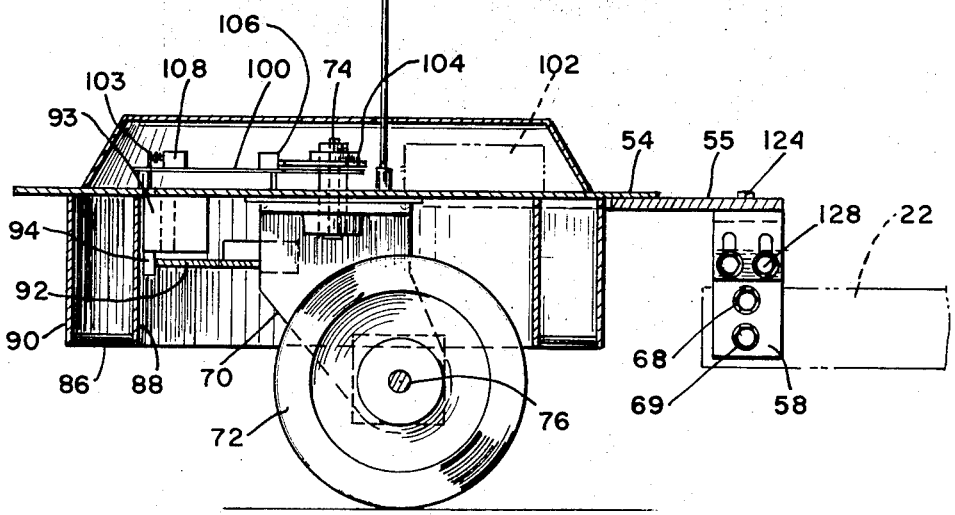
FIG.4

PATENTED APR 2 1974　　　　　　　　　　　　　　　　　3,800,902

METHOD AND APPARATUS FOR THE CONTROL OF SELF-PROPELLED APPARATUS

BACKGROUND OF THE INVENTION

1. Field of the Invention

With reference to the classification of art as established in the U.S. Patent Office this invention pertains to the general class entitled, "Harvesters" and to the subclasses therein entitled, "motorized harvester" and the further subclass of "with randomly operative control of motor" and "with plural sources of power" and "with selective control of drive means." Pertinent subclasses under this last subclass include "by controlling plural drive trains" and the further subclass of "including clutch-assemblages" and the subclass of "connecting motor to cutter or transit wheels".

Also of note is the general class of "Motor Vehicles" and the subclass of "transmission mechanism".

2. Description of the Prior Art

Radio frequency providing remote control for steering, stopping and other functional controls of power mowers, riding mowers, snow blowers and the like are known. Also highly developed and used is radio frequency control for remote control of self-powered model airplanes, boats, etc. Where such control is applied to work-type equipment such as power mowers and snow blowers the function control usually requires quite complicated and expensive equipment often requiring the use of and functional actuation of auxiliary power equipment including hydraulic, pneumatic and electric motors.

Among the many U.S. Patents pertaining to the remote control or operation of self-powered equipment such as power lawn mowers is U.S. Pat. No. 2,698,507 as issued on Jan. 4th, 1955 to SIEBRING. Also of note is U.S. Pat. No. 2,763,116 as issued on Sept. 18th, 1956 to FLINCHBAUGH which particularly relates to a three-wheel arrangement. U.S. Pat. No. 3,411,275 as issued on Nov. 19th, 1968 to MATTSON shows a four-wheeled self-propelled lawn mower similar to that which is depicted as being converted to provide the basic apparatus of the present invention. U.S. Pat. No. 3,052,076 depicts one method of self-guiding a self-propelled apparatus but this arrangement does not provide an inexpensive, operator-selective, precision control of the apparatus.

A precise operator control is shown in the present invention in which a depicted remote control in its simplest arrangement provides a radio frequency transmitter having three operational controls in a single radio frequency channel providing "right", "left" and "stop" signals. In a first embodiment the power for turning is derived from the forward motion of the caster-type steering wheel whose rotation is selectively clutch-coupled to pinions which turn the apparatus connected to the caster-type wheel. In a second or alternate embodiment a battery-powered reversible electric motor actuates the turning apparatus. In a third or another embodiment a speed-reduced drive from the main motor is selectively clutch-coupled to pinions to actuate the turning apparatus. Although wheels for the turning of the apparatus may be used, generally a caster-type wheel is depicted. This wheel is carried by the propulsive apparatus and means is provided to execute right and left turns as well as a remote shut-off function of the apparatus.

SUMMARY OF THE INVENTION

The present invention may be summarized at least in part with reference to its objects.

It is an object of this invention to provide, and it does provide, apparatus whereby a simple remote control system utilizes the power derived from the self-powered apparatus to at least in part provide the power for the steering function of the control system.

It is another object of this invention to provide, and it does provide, a capability whereby a self-powered apparatus such as a power lawn mower is provided with a caster-type wheel which is used instead of the free-moving wheels of the usual apparatus. This caster-type wheel is powered by the forward motion of the apparatus and with the control means uses this power to effect the right or left turning function of the caster wheel with the continued forward motion of the apparatus.

It is a further object of this invention to provide, and it does provide, a steering function which utilizes low cost and light weight batteries to actuate electric clutches during only the short periods of time necessary to effect the steering function of the apparatus.

It is a still further object of the invention to provide, and it does provide, a steering function which utilizes a small reversible electric gear motor to accomplish the turning effort, which motor is powered by the low cost battery which may power the receiver with the gear motor using the battery power only during the short periods of time necessary to affect the steering function of the apparatus.

It is a further object of this invention to provide, and it does provide, a simple remote radio-control system for steering and stopping a lawn mower and like self-propelled apparatus in which particular emphasis is placed upon simplified control signals sent from the remote control transmitter.

It is a further object of the present invention to provide, and it does provide, a capability of substituting, for the non-power driven wheels of a power mower, a caster wheel having apparatus for the steering control and other function controls on the location vacated by the removed wheels of the apparatus.

It is a further object of the present invention to provide, and it does provide, a caster-type wheel which is attached to a base plate of the present invention and utilizes the turning force of the rotated caster wheel as the apparatus is advanced to swing the caster-type wheel. The rotation of the shaft of said caster wheel is selectively clutch-connected to a pinion type member of the apparatus which engages a fixed gear to rotate the caster wheel to the right or to the left to selectively change the direction of the self-powered apparatus to the right or left in response to radio signals or the like.

It is a further object of this invention to provide, and it does provide, a simple remote control for the turn and stop functions of a lawn mower, snow blower and the like, which control is incorporated into and as an original equipment.

In a preferred embodiment the non-powered driven wheels of the power mower are removed and in their stead a caster-type wheel is carried on a support plate attached to the mower to provide a three-wheeled support. Right and left directional signals are fed from a remote radio or other control and effects a functional response to cause the caster-type wheel to be swung to the right or the left or in the absence of a signal to derive its guidance by means of a tendency of a swivel caster to self-align with the path of movement. On each of the ends of the caster wheel axle which turns with the rotation of the wheel there is mounted a pinion which when connected to the axle by a clutch causes the adjacent pinion to be rotated. This rotating pinion engages a fixed circular gear and causes the caster wheel to be swung either to the right or to the left as directed by a remote control signal. The forward motion of this caster wheel continues and the turn function proceeds until the determined turn angle is reached or the operator stops the turn signal before the determined turn angle has been reached. When the turn signal is stopped before the determined turn is reached the pinion is disengaged and the released caster returns to its normal central position. When the turn signal is terminated after the determined turn angle has been reached the caster is initially forced to return toward its central position, then allowed to return to its center position by its normal alignment tendency.

In another embodiment and an alternate thereof, instead of the power for the turn function being derived from the rotation of the caster wheel, the power in one instance is derived from the battery pack which drives a reversible electric motor which is actuated for only the short period of time sufficient to cause the caster wheel to be swiveled or swung to its determined turn extent. In the other or third instance the power is derived from the motor means driving the apparatus. By a belt or other means this motor is connected to one of two gear-connected shafts, each of which carries a clutch and pinion. One of these clutches is actuated to rotate the mounted pinion which engages a gear segment so as to swing the swiveled caster a determined turn amount in the manner of the first embodiment.

In essence several of the modes of operation contemplate that the apparatus will be a three-wheeled apparatus in which two wheels will be power driven and rotated in response to a motor carried by the apparatus and the third wheel will be a caster-type wheel which may be either a single wheel or plural wheels carried by a single frame. This wheel is normally carried by a swivel-type caster frame so that in its normal forward movement the caster wheel trails the pivot axis of the caster frame and the axis of the shaft of the caster wheel is parallel to the axis of the shaft carrying the power driven wheels.

The caster wheel is swung to the right or left to a determined extent to cause the turn to be made while both powered wheels are rotated. Power for this swing action in a first embodiment is derived from the rotation of the caster-type wheel. In the second embodiment the battery supply for the functional control circuit may also be used to power a reversible electric gear motor during only those periods of time a turn is being made. In the third embodiment a belt drive provides a power train from the motor to a pair of geared shafts each having a clutch mechanism which, when actuated, causes a pinion to rotate and move the caster wheel to a turning swing limit to effect a change in the forward direction of the apparatus.

Theory of Operation of the Remote Control Apparatus as Applied to a Power Lawn Mower or Snow Blower This invention provides a radio-type remote control for a lawn mower or snow blower having a pair of like power-driven wheels. Riding or walking lawn mowers of the self-propelling type permit the maintenance of an area such as an acre or the like with a reduction of effort. However, many people having such estates find that for physical or for other reasons it is undesirable to perform the physical exertion necessary to walk behind a self-propelled mower or in some instances to ride on a riding mower. Exposure to sun or the jostling or the jogging may be undesirable from a physical or comfort standpoint. This invention enables the functional control to be performed by a remote apparatus or means.

It is also to be noted that in the use of snow blowers and snow plows, in addition to the physical exertion necessary to guide and direct such apparatus in removing snow, the requirement of its use often occurs in extreme cold or uncomfortable conditions. This invention applied to conventional snow removal equipment removes the exertion which may be dangerous to the operator's physical condition and permits remote controlled equipment to be operated in sheltered and protected conditions and makes the removal of snow a not unpleasant task. The functional control of this invention permits the mower or the blower to be advanced or reversed as required. The reverse function control, in addition to changing the driving wheel rotation, automatically locks the caster wheel in its normal straight forward moving direction. The turning guide of the blower is accommodated by the turning of the caster wheel in a manner similar to that shown in the present invention.

An important object of the present invention is to use the common caster wheel as a simple guiding means for the apparatus. Normally a power mower, snow blower, or like self-propelled apparatus drives only two wheels with a forward or reverse motion. In the present invention a caster wheel is attached to a support plate and the apparatus housing to provide a three-wheel support. The vertical shaft of the caster is a determined distance from the line connecting the two driven wheels and in a plane normal to this line. Usually this plane bisects the shaft connecting the two driven wheels. The caster wheel when it is permitted to freely move will tend to align itself so that the axle of the wheel is parallel to the axis of the axle or line between these two driven wheels. When the two like-sized driven wheels turn at a like speed the forward movement of the self-propelled apparatus tends to travel in a straight path. This straight path can be altered to a curved or turning path when the caster wheel is forced to turn a determined extent about its vertical spindle support axis and is held at this determined turn angle. While the caster wheel is held at this determined angle the apparatus will transcribe a turn but when the caster wheel is released it will quickly realign itself to the forward path of the drive wheels whereby a straight path pattern is again achieved.

The present invention utilizes this principle to negotiate right- or left-hand turns and upon completion of these desired turns the caster is released so that the power apparatus, for example a power mower, quickly returns to the straight path newly defined. The present apparatus, to be hereinafter more fully described in the preferred embodiment and alternates, accomplishes the right- or left-hand turns without need of a differential on the driven wheels. In the preferred embodiment, to be more fully described, it is to be noted that the operator of the remote controlled transmitter has in the case of a self-propelled power mower three commands, each actuated by a push button, these commands are left, right and stop. Each command modulates a radio frequency carrier with its modulated frequency, the resultant being transmitted to the receiving antenna carried by the power mower. The signal is demodulated and amplified by the radio receiver channel which utilizes that particular frequency to energize certain mechanical portions of the apparatus.

In brief, this invention when applied to a self-propelled power mower anticipates that instead of a four-wheeled walking or riding apparatus the two wheels which are non-driving are removed and replaced by the single caster-type wheel. This caster wheel is carried by an axle to which it is securely attached. Upon each extending end portion of this axle is carried a clutch both of which are electrically actuated. Each clutch when actuated is coupled to a drive pinion both of which have teeth that engage a circular track carried by a support plate also carrying the caster wheel. Upon a turn signal command received by the radio receiver from a small radio transmitter, one of the clutches will be engaged to cause the adjacent pinion to be coupled to the drive shaft of the caster wheel. As the caster wheel is being rotated by the forward movement of the self-propelled mower, the rotating axle causes the pinion to be rotated. As the pinion turns it engages the fixed gear carried by a plate causing the caster wheel to rotate around its vertical axis for a determined distance which generally is usually about 60°, thus causing a turn of the apparatus to be achieved. As reduced to practice this turn leaves an uncut circle of about 3 feet in diameter. As quickly as a 60° or other extent of turn is performed the clutch is disengaged permitting the caster wheel to swivel back to its normal condition which is with its axle parallel to the driving shaft of the axis of the drive wheels which enables and permits the power mower to travel in this newly directed straight line.

In an alternate embodiment instead of using the rotary motion of the caster wheel to provide the power for actuating the pinion to enable the caster wheel to be swiveled, the power may be derived from the battery powering the receiver and clutches. An electric motor carried on the caster wheel housing uses this battery power only during the turning period to rotate a pinion a determined distance to cause a turn of the mower to be accomplished. A clutch may be provided on the pinion shaft, which clutch after the desired turn extent is executed is disengaged to enable the caster wheel to return by itself to a normal condition, otherwise the motor is reversed to cause the caster wheel to be straightened to its desired steering condition.

In yet another alternate embodiment, the power for the turning of the caster wheel is provided by connecting the drive shaft of the motor by a belt or the like to one of two gear-connected shafts each of which carry a clutch and pinion. A clutch is actuated to cause the pinion to swing the caster wheel to a determined amount.

In addition to the above summary the following disclosure is detailed to insure adequacy and aid in the understanding of the invention. This disclosure, however, is not intended to prejudice that purpose of a patent which is to cover each new inventive concept therein no matter how it may later be disguised by variations in form or additions of further improvements. For this reason there has been chosen a specific embodiment of the steering control for the self-powered apparatus as adopted for use on lawn mowers, snow blowers and the like and showing a preferred means for providing power for the functional control. This specific embodiment, and alternate embodiments thereof, have been chosen for the purposes of illustration and description as shown in the accompanying drawing.

BRIEF DESCRIPTION OF THE DRAWINGS

FIG. 1 represents an isometric view of a self-propelled lawn mower having a radio receiver providing for the remote control thereof by a radio transmitter, the functional apparatus attached to and extending from the housing of a lawn mower whose handle is attached at the powered wheels end of the housing;

FIG. 2 represents an isometric view of a remote controlled self-propelled lawn mower like that of FIG. 1, this mower having its handle attached to the lawn mower at the housing end opposite the self-propelled wheels;

FIG. 3 represents a bottom view of the frame and caster wheel drive train which is attached to or made as an integral portion of the lawn mower, this view showing the preferred arrangement of the mechanism for turning the caster-type wheel in response to a signal from a remote control transmitter with the functions actuated by signals from said transmitter or switches on the handle;

FIG. 4 represents a partly sectional and partly diagrammatic side view of the mechanism and frame of FIG. 3 and showing in more detail the arrangement of the components which are actuated to cause the caster-type wheel to be moved in response to said signals, this view being generally taken on the line 4—4 of FIG. 3 and looking in the direction of the arrows;

FIG. 6 represents a somewhat diagrammatic representation of an end view of the pinion and pin-type circular gear as used in the apparatus of FIG. 3;

FIG. 9 represents a side view of an adjusting bracket which provides one means by which the caster wheel apparatus is raised and lowered to provide a desired cutting height;

FIG. 10 represents an end view of the bracket as taken on the line 10—10 of FIG. 9 and looking in the direction of the arrows;

In the following description and in the claims various details will be identified by specific names for convenience. The names, however, are intended to be generic in their application. Corresponding reference characters refer to like members throughout the several figures of the drawings.

Figure 5:
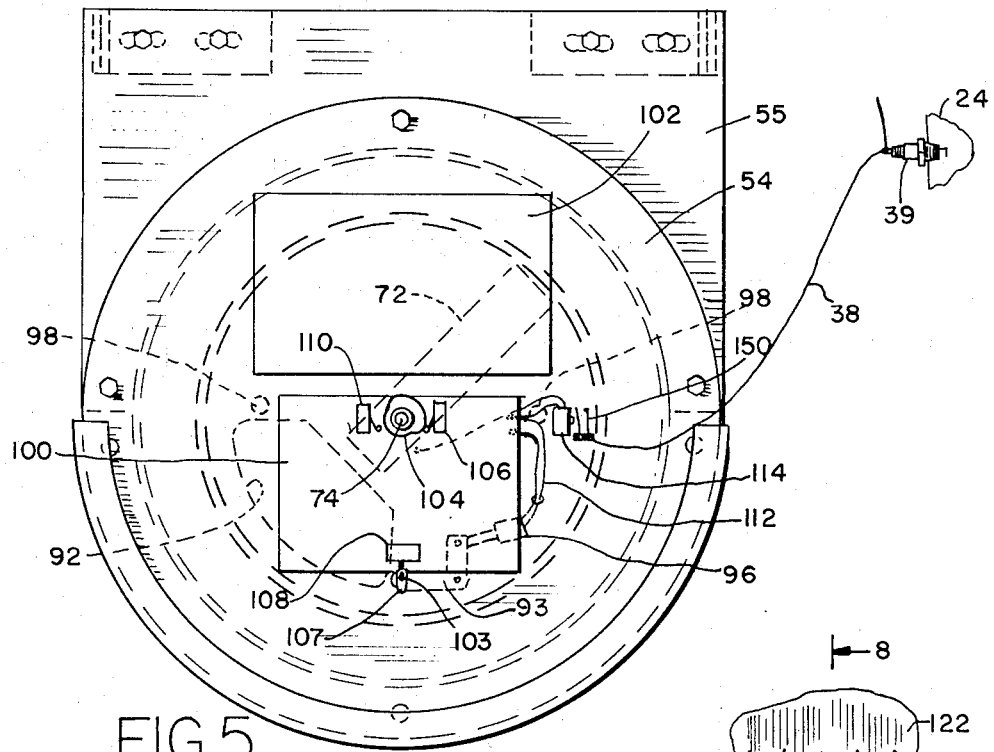
FIG. 5 represents a somewhat diagrammatic top view looking toward the caster wheel steering apparatus such as shown in the bottom view of FIG. 3.

The drawings accompanying, and forming part of, this specification disclose certain details of contruction for the purpose of explanation of the broader aspects of the invention, but it should be understood that structural details may be modified in various respects and that the invention may be incorporated in other structural forms than shown.

DESCRIPTION OF THE PREFERRED EMBODIMENT OF FIGS. 1–10

Referring now to the drawings and in particular to FIGS. 1–10 there is depicted in FIG. 1 a self-propelled lawn mower generally identified as 20. This lawn mower, as shown, includes a housing 22 upon which is mounted a conventional motor 24 which generally is contemplated as being a two- or four-cycle gasoline powered engine such as usually is provided on self-propelled lawn mowers. This motor 24, by means of conventional apparatus such as a chain or belts, not shown, drives a shaft 26 which rotates mounted and secured gears 28 to cause powered wheels 30 carried by the frame 22 to be rotated to move the mower. Handles 32 are conventionally attached to the rear end of this lawn mower housing 22 near the powered wheels and may be the handles furnished as original equipment. At the upper ends of these handles near or on the handgrip portion of these handles 32 are provided actuating buttons 34 and 35 which are electrical contact means. These contact buttons are used when hand control of the caster wheel steering apparatus is desired. This control is hereinafter more fully described in conjunction with the circuit diagram of FIG. 19.

A shut-off wire 38 extends from the motor spark plug 39 and through a cover portion 40 which protects the inner workings of a caster wheel apparatus generally protected by a skirt 42. Extending upwardly from cover 40 is a small antenna 44 which receives signals from an antenna 46, said signals emanating from a transmitter 48 having switches 49, 50 and 51 for control of left, right and stop modes provided as a part of the remote control operation of this apparatus. A platform or plate 54 carries the caster-control mechanism to be hereinafter more fully described. This plate member 54 is attached to housing 22 by means of plate 55 and bracket members 56 and 58 to be more fully described hereinafter in conjunction with FIGS. 9 and 10. Frame 22, as depicted, has its front wheels which are the non-power wheels removed to permit the attachment of platform 54 and plate 55 to the housing 22.

DESCRIPTION OF EMBODIMENT OF FIG. 2

FIG. 2 is a representation of a lawn mower substantially identical to that seen in FIG. 1; however, as depicted, this apparatus includes a power mower 60 whose front wheels 62 are the driven wheels and wherein the handle portions 64 may be original equipment attached to the end of the mower frame 66 and at the rear portion thereof. As shown, the freely rotating wheels have been removed to permit the installation of the apparatus carried by platform 54 and plate 55. As depicted in FIG. 2, frame 66 carries a motor 24 identical to that seen in FIG. 1 and powers a shaft 26 and drive wheels 62 in the manner of FIG. 1. The handle portions 64 are mounted on the frame 66 on the end opposite the power-driven wheels and incline backwardly over the top of the caster wheel apparatus carried by platform 54 so that the handles 64, which include switches 34 and 35, permit the lawn mower as hereby depicted to be hand-controlled by use of the handles and these mounted switches while the remote controlling radio transmitter is or is not in use.

CASTER WHEEL APPARATUS AS SEEN IN FIGS. 3 AND 4

Referring now in particular to FIGS. 3 and 4, it is to be noted that the housing 22 as seen in the bottom and side views carries the extending portion of platform 55 which is attached to the lawn mower frame 22 by means of bolts 68 and 69 which secure brackets 58 to the frame. Carried by plate 54 is a caster wheel assembly which includes a wheel-supporting frame portion 70 and the caster wheel 72, said wheel being depicted as a single wheel but may, of course, be arranged to include two wheels closely spaced to each other to provide the effect of a single track wheel. As noted, this caster is a swivel-type wheel which is rotatably mounted to platform 54 and by means of appropriate bearings permits the caster wheel to be freely swung in an arc. This frame is also attached to and carries shaft 74. As the frame 70 is swung this vertical shaft 74 also is turned.

Referring now in particular to FIG. 3, it is to be noted that a shaft 76 carried the caster wheel 72 which is fixedly attached to said shaft so as to turn with it. This shaft extends outwardly both left and right a short distance beyond each of the downwardly extending ends of frame 70. As seen in the right-hand sectional portion of the view of FIG. 3, shaft 76 extends outwardly from the frame 70 a few inches. An electric clutch 78 is carried adjacent to and outwardly of the frame 70 and on shaft 76. When said apparatus is forwardly mounted this clutch may be responsive to the right-turn signal while a like clutch 79 on the other side of caster wheel 72 is responsive to the left-turn signal. When the apparatus is arranged as in FIG. 2 the clutches 78 and 79 are oppositely responsive. Carried by a sleeve bearing 80 mounted on the shaft 76 is an outwardly extending hollow shaft 82 which fixedly carries on its outer end a toothed pinion 84. A side view of this pinion is depicted in FIG. 6 in which the pinion is shown with long, rather sharp teeth contoured so as to engage pins 86 which are arranged in a like-spaced radial array and are secured to and carried by inner and outer circular members 88 and 90. These ring-like members have their radiuses more or less in coincidence with the axis of the vertical shaft 74.

The electric clutch, as shown in section in FIG. 3, is conventional in construction and when actuated draws the supported hollow shaft 82 and its retaining flange toward and to the coil portion of the clutch. Any electrically actuated clutch may be used providing that when actuated a positive drive may be transmitted to couple the rotation of shaft 76 to shaft 82. The left portion of shaft 72 extending beyond frame 70 and the mounted components thereon is a mirror image of the right-hand side view shown in section.

Carried by and movable with caster frame 70 as it is turned is a cam plate 92 which is contoured with an outer arcuate surface and two end stop surfaces. An "L"-shaped pivoted crank arm 93 carries on one end a cam pin carrying thereon a cam follower-type pin and roller 94 which is urged into engagement with the outer arcuate and end stop surfaces by means of a tension spring 95. A solenoid 96 carried by platform 54 is connected to the end of the other length of arm 93 and upon response of a signal is actuated to pull pin and roller 94 into engagement with the end stop surfaces of plate 92 in harmony with spring 95. Stop or limiting pins 98 are carried on platform 54 and are disposed on each side of wheel 72 so that as the caster is swung to the right or left an end of the cam plate 92 engages a stop pin 98 which defines the maximum mechanical turn limit of the caster.

The circular pin-type gear carried by platform 54, as depicted, has inner and outer metal rings which are spaced a substantial distance apart so that as the swivel caster frame 70 is swung, any play or angular displacement of the pinions does not cause the pinion teeth to engage either the inner or outer rings. The spacing of the pins and their planer position from platform 54 is made to accommodate the size and design of the swivel caster. The teeth of the pinion 84 are also made long and narrow so as to permit loose engagement or play of the pinion in the gear. Also seen in FIG. 4 is a printed circuit board 100, battery supply 102, pin 103 and cam 104. Also seen are switches 106 and 108 which are preferably miniature-type switches. Their function is described later. Still referring to FIG. 4, it is to be noted that the caster wheel 72 is of a determined diameter so that the teeth of the pinion 84 are sufficiently above ground level enabling the caster wheel 72 and axle 76 to be rotated. The teeth of the pinion thus does not come in contact with terrain when common terrain undulations are encountered.

CONTROL APPARATUS OF FIG. 5

Referring now in particular to FIG. 5 and a top view of the apparatus to a great extent shown in FIG. 3, this view is made with cover 40 removed so as to show a preferred positioning of battery 102 and circuit board 100 and shall be considered forwardly mounted. Shaft 74 which is connected to frame 70 extends through platform 54 and cam 104 secured to its upper end turns with shaft 74. As shown, wheel 72 is turned clockwise at about 45° whereat lobed cam 104 actuates switch 106 which activates solenoid 96. When a turn angle of about 60° is reached the pin and roller 94 are at the end of cam 92 thereby allowing solenoid 96 and spring 95 to move pin and roller 94 to a hold position along the hold side of cam 92. As arm 93 is moved by spring 95 extension pin 103 which protrudes through and moves in slot 107 is also moved toward and engages switch 108 to actuate this switch. The closing of switch 108 de-energizes clutch 78 thereby preventing further turning.

Another switch 110 is disposed so as to be actuated by the lobe of cam 104 in a manner similar to switch 106 where and as the wheel 72 is swung in the other turn condition.

When the operator signals a turn command the wheel 72 is rotated about its vertical axis by means of clutch 78 as described above. This action is stated logically as follows:

Right turn = Wheel 72 is rotated clockwise about its vertical axis by the clutch 78 means = $A_R \cdot \bar{B} = A_R \bar{B}$ Left turn = Wheel 72 is rotated counterclockwise about its vertical axis by the clutch 79 means = $A_L \cdot \bar{B} = A_L \bar{B}$ Where:
$A_R$ = The right turn command is received as determined by the relay contact to 332 of FIG. 19;
$\bar{B}$ = The activation of switch 108 as described above has not yet occurred: this corresponds with the condition that the caster wheel is *not* at either right or left maximum determined turn angle;
$A_L$ = The left turn command is received as determined by the relay contact to 330 of FIG. 19;
. = Logic "and" symbol.

If the turn command signal is continued by the operator, such as during a circular path, clutch 78 remains unenergized, solenoid 96 remains energized, thereby holding pin and roller 94 to the side of cam 92, thereby preventing cam and wheel 72 from returning to a straight ahead position thus maintaining a circular path as defined by the maximum turning angle.

The action whereby the maximum turning angle is held by cam 92 and pin and roller 94 as described above is stated logically as follows:

Hold turn = Wheel 72 is held at the maximum determined angle about its vertical axis = $A_R B + A_L B = B(A_R + A_L)$ Where:
$A_R$ = The right turn command is received as determined by the relay contact to 332 of FIG. 19.
$A_L$ = The left turn command is received as determined by the relay contact to 330 of FIG. 19.
B = The activation of switch 108 has occurred. This corresponds with the condition that the caster wheel is at either right or left maximum determined angle.

When the operator ceases the turn command signal, solenoid 96 becomes unenergized thereby removing its force which holds pin and roller 94 to the side of cam 92. The force of spring 95 and cam side arcuate can be configured to provide release from the hold turn by the natural torque which attempts to rotate the wheel about its vertical axis toward a straight ahead position. However, this design is restrictive in the sense that a particular spring and cam side arcuate are suitable for a particular self-propelled apparatus or a relatively limited variation therefrom.

The preferred method of returning the wheel to a straight ahead position provides for much greater variations of the self-propelled apparatus to which the control apparatus is attached and is described as follows.

When the operator ceases the turn command signal, solenoid 96 becomes unenergized and the opposite clutch 79 becomes energized. Therefore, the clutch torque, in addition to the natural torque, will drive the pin and roller 94 up the side of cam 92 thereby releasing its hold upon the cam. As the wheel moves toward a straight ahead position the clutch 79 remains energized until the wheel has approached a predetermined angle about its vertical axis.

Figure 19:
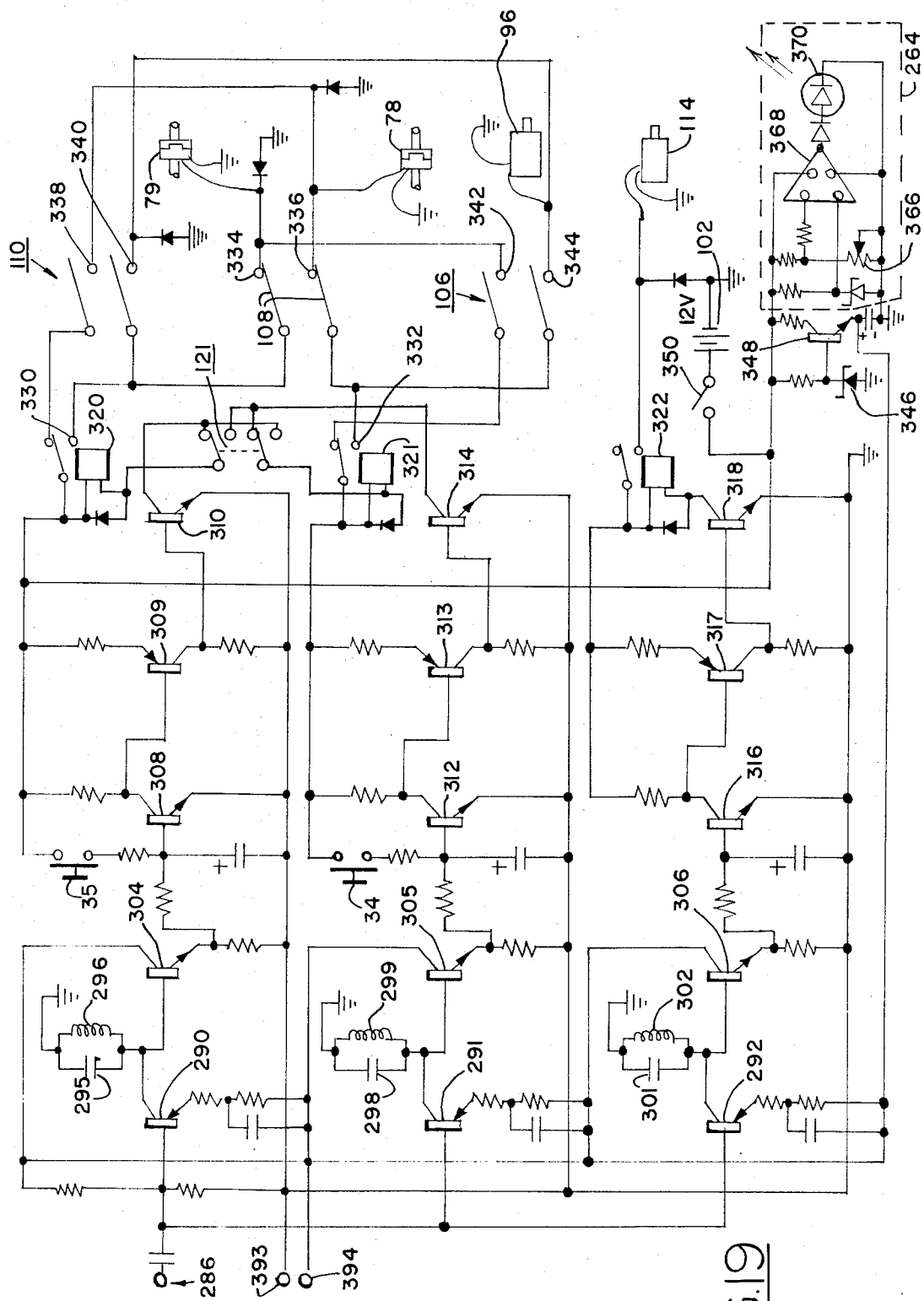
FIG. 19 represents a circuit diagram showing the electrical circuit for the remote functional controls of the apparatus.

The action whereby the opposite clutch becomes energized for a determined extent as the wheel returns to a straight ahead position from a hold turn is stated logically as follows:

Right turn = Wheel 72 is rotated clockwise about its vertical axis by the clutch means $78 = \bar{A}_L B_L$ Left turn = Wheel 72 is rotated counterclockwise about its vertical axis by the clutch means $79 = \bar{A}_R B_R$ Where:

$\bar{A}_L$ = The left turn command is *not* received as determined by the relay contact *not* to 330 as seen in FIG. 19.

$B_L$ = The wheel 72 is within a predetermined arc about its vertical axis, extending from the maximum left turning angle to the predetermined angle as set by the de-actuation of switch 106 by cam 104.

$\bar{A}_R$ = The right turn command is *not* received as determined by the relay contact *not* to 332 as seen in FIG. 19.

$B_R$ = The wheel 72 is within a predetermined arc about its vertical axis, extending from the maximum right turning angle as set by de-activation of switch 110 by cam 104.

The complete logic equations which describe the energizing of each clutch which causes turning of the wheel 72 about its vertical axis are:

Right turn = Wheel 72 is rotated clockwise about its vertical axis by the clutch means $78 = A_R \bar{B} + \bar{A}_L B_L$ Left turn = Wheel 72 is rotated counterclockwise about its vertical axis by the clutch means $79 = A_L \bar{B} + \bar{A}_R B_R$ Where $A_R$, $\bar{A}_R$, $A_L$, $\bar{A}_L$, $\bar{B}$, $B_R$ and $B_L$ are as described above.

The equations and definitions are for the case of the forward mounted case as shown in FIG. 1. These equations also apply when the control apparatus is attached to the rear of the self-propelled apparatus as shown in FIG. 2. However, the terms clockwise and counterclockwise and clutch 78 and clutch 79 as seen in the equation definitions must in the embodiment of FIG. 2 be interchanged. This is accomplished electrically by means of switch 121 in FIG. 19. When switch 121 is set for rear mounting the definitions for right and left turns are:

Right turn = Wheel 72 is rotated counterclockwise about its vertical axis by the clutch 79.

Left turn = Wheel 72 is rotated clockwise about its vertical axis by the clutch 78.

A right turn signal then causes relay contact to 330 and a left turn signal causes relay contact to 332.

Leads 112 are attached to solenoid 96 and through a hole in platform 54 are attached to the circuit carried by board 100. Also attached to platform 54 is a switch 150 which when actuated by a solenoid 114 is closed to connect spark plug 39 through conductor 38 to the ground of motor 24. This, of course, shuts off the motor and further progress of the machine.

Figure 7:
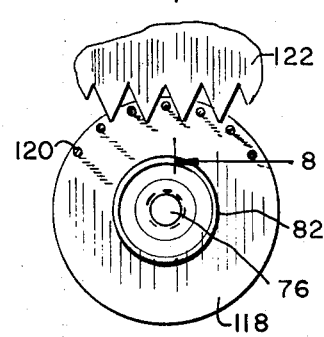
FIG. 7 represents a side view of an alternate construction of a pinion and circular gear in which the pinion is made with a pair of circle members in which are mounted pins and the gear is a toothed member arranged in a circular configuration.
Figure 8:
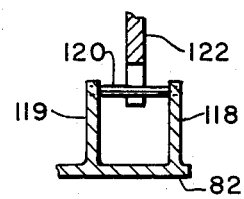
FIG. 8 represents an end view of the pinion and gear of FIG. 7, this view taken on the line 8—8 and looking in the direction of the arrows.

Alternate Construction of FIGS. 7 and 8

Referring next to FIGS. 7 and 8 there is shown an alternate construction of a pinion and circular gear. On shaft 76 and hollow shaft 82 this alternate pinion includes a pair of spaced discs 118 and 119 secured to hollow shaft 82 as by welding. In holes radially and equally spaced near the outer diameter of the disc are secured pins 120 which extend between these discs to form a cage-like pinion. A circular gear member 122 may be made by casting or stamping and may be of plastic or metal. These pinions and circular gear provide the same mechanical function or result as the toothed pinion and cage-like circular gear of FIGS. 3 through 5.

Bracket of FIGS. 9 and 10

Referring next to FIGS. 9 and 10, there is depicted a bracket assembly which easily and positively permits a height adjustment of plate 55 to the desired relationship with the blade of the mower. Bracket 56 is secured to plate 55 by means of bolts 124 passing through holes formed in this plate. A hole 126 and slot 127 formed in plate bracket 58 provide means for using two bolts to secure this plate bracket to lawn mower housing 22. Hole 126 and slot 127 accommodate the usual hole spacings encountered in the more common mower housings 22. Bolts 128 pass through slots 130 formed in plate 58 and draw plate 58 into the desired adjusted position which is maintained against slippage by drawing into engagement the facing serrated or corrugated surface portions 132 and 133.

Figure 11:
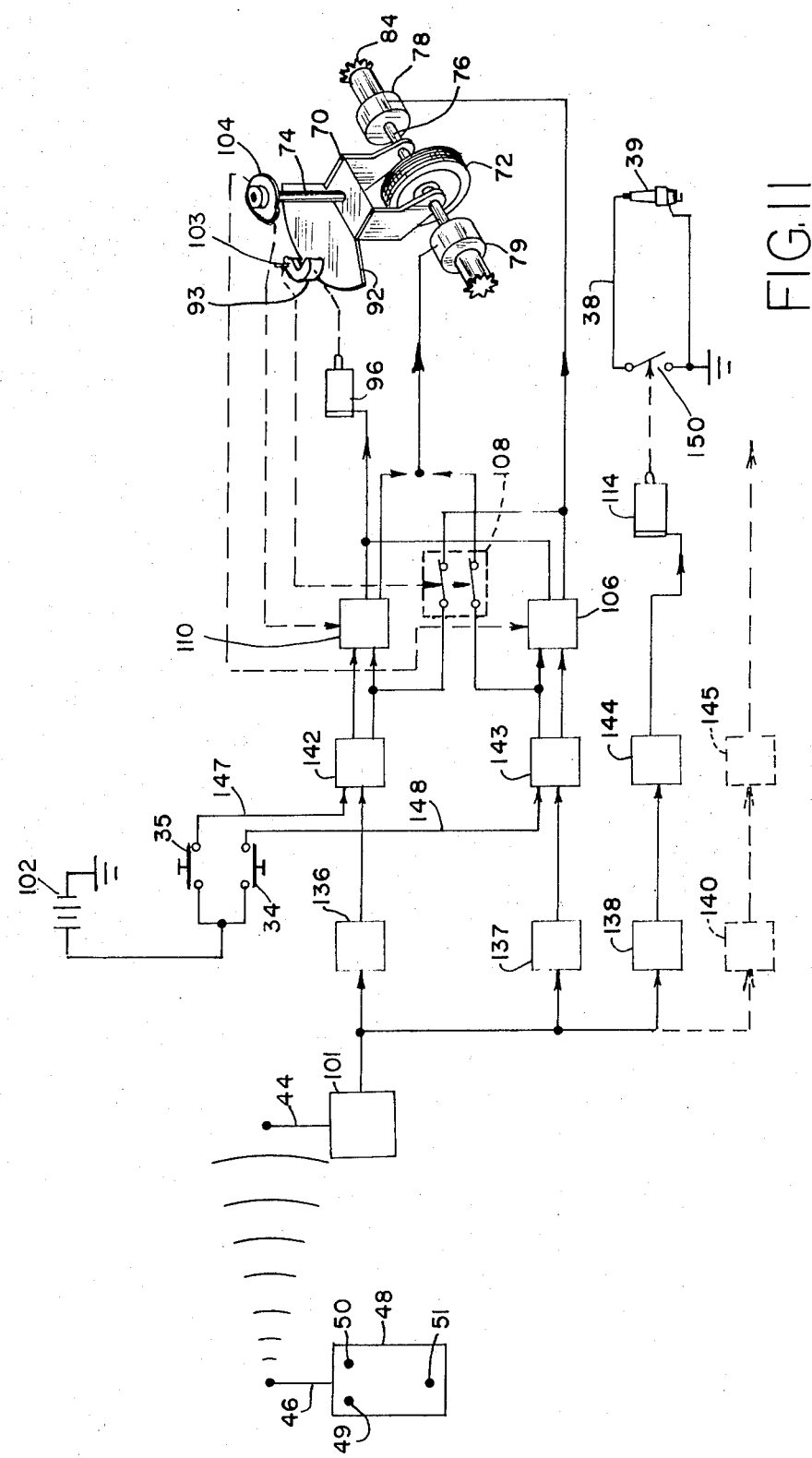
FIG. 11 represents a somewhat functional block diagram showing the operational arrangement of the electrical circuit providing for the actuation by remote control of the steering apparatus of this invention.

Block Diagram of FIG. 11

Referring next to FIG. 11, there is depicted a block diagram showing the electromechanical function control of the apparatus of FIGS. 1 – 10. Switch 121 (shown in FIG. 19) is an apparatus installation switch to cause proper channel actuation when the apparatus is forwardly mounted or rearwardly mounted. This switch is shown in circuit diagram FIG. 19 for the forwardly mounted configuration shown in FIG. 1. To configure the apparatus for a rearwardly mounted apparatus as shown in FIG. 2, switch 121 is set to its other position and plate 54 is secured to plate 55 at 180° rotation from its forwardly secured position. The described workings which follow consider the forwardly mounted configuration and for clarity of operation switch 121 is not shown in this FIG. 11. As seen, a portable radio transmitter 48 has at least three selected modulation frequencies which modulate the radio frequency carrier and supply the left- and right-turn commands as well as the stop command. Switches 49, 50 and 51 actuate the transmitter to send the desired signal by antenna 46 to antenna 44 of the radio receiver 101 contained on circuit board 100. This received signal is demodulated and amplified by the radio receiver which simultaneously feeds frequency selective amplifiers 136, 137 and 138, respectively responsive to the left-turn, right-turn and stop frequency signals. Also shown as a dashed line is a typical added frequency selective amplifier 140 which may be provided for another functional control where desired. Such a control may be a reverse function.

Amplifier 136 is connected to power switch 142. Amplifier 137 is connected to power switch 143. Amplifier 138 is connected to power switch 144 and where and when used amplifier 140 is connected to power switch 145, shown in dashed outline. Also connected to power switch 142 is a conductor 147 extending to switch 35 carried on the handles of the apparatus. A conductor 148 is connected to power switch 143 and switch 34 carried on the other handgrip of the handle. Battery supply 102 provides current to both switches 34 and 35. Switch 106 is connected to power switch 143, right turn clutch 78, hold solenoid 96 and is actuated by cam 104. At about a 45° right turn, switch 106 is actuated by cam 104 thereby energizing hold solenoid 96. At about 60° right turn, crank arm 93 moves along the side of plate 92 and pin 103 actuates switch 108 which removes power to right turn clutch 78. With a continued right turn signal received, plate 92 is held at about 60° right turn by pin and roller 94 and solenoid 96. When this received right turn signal ceases, left turn clutch 79 is energized thereby removing the hold action on plate 92. At a return angle of about 45° switch 106 returns to its original position thereby removing power from the left turn clutch 79 and allowing a natural return to the straight angle of about 0°. A similar action occurs for left turns, said action involving switch 110, cam 104, solenoid 96, plate 92, pin 103, switch 108, clutch 79, pin and roller 94 and clutch 78. Similar performance occurs when switches 35 and 34 are activated by the operator for left or right turns. Hold solenoid 96 is responsive to a logic = $A_L B_L + A_R B_R$.

The output of power switch 144 is fed to solenoid 114 which closes normally open switch 150. When this switch is closed spark plug 39 is shorted out through conductor 38 which is connected through closed switch 150 to ground.

Use and Operation of the Apparatus of FIGS. 1–11

The embodiments shown in FIGS. 1 and 2 contemplate that the construction of a self-propelled lawn mower is usually made in one of two arrangements. In the first arrangement an existing lawn mower, which may be in the possession of the user, is converted for remote control by the removal of the two non-driven wheels and by means of the mounting brackets as shown in FIGS. 9 and 10 the plate 55 is mounted to the mower housing 22 as in FIGS. 1 or 2. After the mounting of the caster wheel assembly to the mower housing the height of the plate 55 is adjusted to correspond to the desired height of the housing 22 and provide the desired cutting height to the blade of the mower. In the other instance it is assumed that the manufacturer of the mower will provide this remote control unit as an improved model of his self-propelled mower in which case the two non-driven wheels, of course, are not provided on the housing of the mower and the housing is drilled and the caster wheel apparatus is attached by means of similar brackets on a unit housing to secure the remote control apparatus depicted in FIGS. 3 - 5.

With this apparatus the operator of the remote control transmitter 48 will have at least three command push buttons to provide left, right and stop functions, which functions are controlled by push buttons 49, 50 and 51. When one of these buttons is pushed, the command will modulate a radio frequency carrier of the transmitter to provide a particular carried modulated signal which is radiated by means of antenna 46 to antenna 44 carried by the swivel wheel caster apparatus as depicted in FIGS. 1 and 2.

The radio receiver 101 demodulates the modulated frequency signal and amplifies this demodulated signal. This signal is selectively amplified by frequency selective amplifier 136 or 137 or 138 or 140. This amplified signal output is then sent to power switch 142 or 143 or 144 or 145 to provide the desired functional control. Solenoid 114 which when actuated stops the motor of the self-powered apparatus when a stop signal from button 51 is fed through power switch 144 to solenoid 114. A cut-off valve in the gas supply line or a throttle may be used to shut off the motor 24 in the conventional manner.

Stops 98 carried by the platform 54 provide mechanical limits for the right or left turns. These stops are established at a slightly greater angle of turn than the turn extent necessary to activate hold switch 108. The stops, of course, prevent stress to the clutch wire which is avoided by limited rotation of less than a full circle, which condition would occur if continuous overtravel were permitted.

Figure 12:
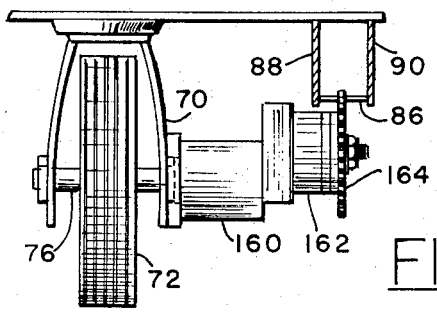
FIG. 12 represents a fragmentary and partly schematic front view showing an electrical reversible means and a clutch which when actuated moves a pinion to cause the caster wheel to be swung around its vertical support pin to a desired degree.

Alternate Embodiment of FIG. 12

Referring next to FIG. 12, there is depicted a somewhat diagrammatic front view of an alternate caster turning drive in which an electric motor is utilized to rotate a pinion which engages a circular gear to turn the caster wheel frame. This embodiment does not use the caster wheel rotation to power the pinion as does the embodiments depicted in FIGS. 1 - 11.

As particularly seen in FIG. 12, caster wheel 72 is carried by shaft 76 rotatably mounted in frame 70. Attached to one side of frame 70 is a reversible electric gear motor 160 which carries on its output shaft a clutch 162 which when activated transmits the motor rotation to the clutch output member to rotate a pinion 164 which is similar or identical to pinion 84 as seen in FIGS. 3 and 6. Inner and outer circular members 88 and 90 carry and retain pins 86 in a spaced array to form a circular gear segment which is at least more than 120° in arc. This gear motor 160 is connected in place of right and left turn clutches 78 and 79 shown in FIGS. 11 and 19. The extent of turn motion is controlled by the same circuit and apparatus as described in FIG. 11. The swivel caster in this embodiment is moved by the gear motor in response to a signal. The clutch 162 provided with this apparatus is energized when the motor is energized. The clutch is de-energized when the motor is de-energized. When the turn signal is deactived the caster wheel 72 is permitted to swing to its normal path. Wheel 72 is rotatably mounted on shaft 76 and the shaft 76 is fixedly mounted to housing 70. Gear motor 160 is attached to the frame 70 and its output may be at a different level than the caster wheel shaft. Upon being released from its turn actuation the free turning pinion 164 permits the caster to swing back to a normal straight forward tracking condition as above-described in conjunction with FIGS. 1 – 11.

DESCRIPTION OF THE ALTERNATE EMBODIMENT OF FIG. 13

Figure 13:
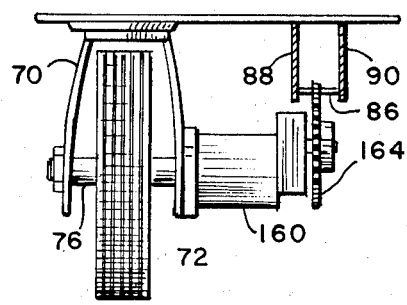
FIG. 13 represents a fragmentary and partly schematic front view similar to that of FIG. 12 but with the caster wheel being swung in an arc around its pivot pin by means of an electric reversible motor directly coupled to a pinion.

In the manner of the electric-motor driven apparatus of FIG. 12, the turn apparatus of FIG. 13 includes a freely rotatable caster wheel 72 as carried on a shaft 76 in a frame 70. Electric gear motor 160 is mounted on frame 70 and its output shaft is direct coupled to and carries pinion 164 which engages the arcuate pin-type gear comprising inner and outer segments 88 and 90 with spaced and secured pins 86 extending therebetween. In the turning actuation of the caster the electric gear motor 160 is connected to provide either a forward or reverse rotation. These connections are in place of left and right turn clutches 78 and 79 as shown in FIG. 11. Limit switches are established to prevent the rotation of the motor 160 and attached pinion 164 from continuing past a certain condition. This limitation of the forward and reverse rotation of the motor limits the degree of turn and after the turn is completed, as denoted by the operator, the motor is reversed from this turn limit and continues until the wheel 72 is brought into a straight ahead condition at which the motor is de-energized.

When the operator signals a turn command the action whereby the wheel 72 rotates about its vertical axis as described above can be stated logically and is identical to the logic defined for the control apparatus of FIG. 5, namely:

Right turn = Wheel 72 is rotated clockwise about its vertical axis by the motor means = $A_R \cdot \bar{B} = A_R \bar{B}$ Left turn = Wheel 72 is rotated counterclockwise about its vertical axis by the motor means = $A_L \cdot \bar{B}$ = $A_L \bar{B}$ Where:
$A_R$ = The right turn command is received as determined by the relay contact to 332 of FIG. 19.
$\bar{B}$ = The caster wheel is not at either right or left maximum determined turn angle.
$A_L$ = The left turn command is received as determined by the relay contact to 330 of FIG. 19.
. = Logic "and" symbol.

The above logic equations and definitions are for the case of the forward mounted case as shown in FIG. 1. These equations also apply when the control apparatus is attached to the rear of the self-propelled apparatus as shown in FIG. 2. However, the terms clockwise and counterclockwise as seen in the equation definitions must in the embodiment of FIG. 2 be interchanged. This is accomplished electrically by means of switch 121 in FIG. 19. When switch 121 is set for rear mounting the definitions for right and left turns are:

Right turn = Wheel 72 is rotated counterclockwise about its vertical axis by the motor means.
Left turn = Wheel 72 is rotated clockwise about its vertical axis by the motor means.

When a right turn command is received a right turn signal then causes relay contact to 330 and a left turn signal causes relay contact to 332.

When the operator ceases a turn command signal the action whereby the wheel 72 is rotated by the motor about its vertical axis toward a straight ahead position as described above can also be described logically and is identical to the logic defined for the control apparatus of FIG. 5, namely:

Right turn = Wheel 72 is rotated clockwise about its vertical axis by the motor means = $\bar{A}_L B_L$ Left turn = Wheel 72 is rotated counterclockwise about its vertical axis by the motor means = $\bar{A}_R B_R$ Where:
$\bar{A}_L$ = The left turn command is not received as determined by the relay contact not to 330 of FIG. 19.
$B_L$ = The wheel 72 is counterclockwise of the straight ahead position by a predetermined extent as determined by cam 104 actuating switch 110 shown in FIG. 5.
$\bar{A}_R$ = The right turn command is not received as determined by the relay contact not to 332 of FIG. 19.
$B_R$ = The wheel 72 is clockwise of the straight ahead position by a predetermined extent as determined by cam 104 actuating switch 106 shown in FIG. 5.

The motor has a built in gear box with a high step down ratio, therefore, the torque required to rotate the output shaft is adequate to hold the wheel 72 at its maximum turning angle without the need of additional restraining means. Thus, the restraining mechanism described in FIG. 5, namely cam 92, pin and roller 94, arm 93, spring 95, switch 108 and solenoid 96 are not required. However, if only solenoid 96 is removed the maximum turning angle may be sensed by those remaining items which assist to actuate switch 108 which could be used to remove power to the motor 160.

The complete logic equation which described the energizing of the motor to cause the wheel 72 to rotate about its vertical axis is as follows:

Right turn = Wheel 72 is rotated clockwise by motor 160 = $A_R \bar{B} + \bar{A}_L B_L$ Left turn = Wheel 72 is rotated counterclockwise by motor 160 = $A\bar{B} + \bar{A}_R B_R$ Where:
+ = Logic OR symbol All other symbols are as described above.

Figure 14:
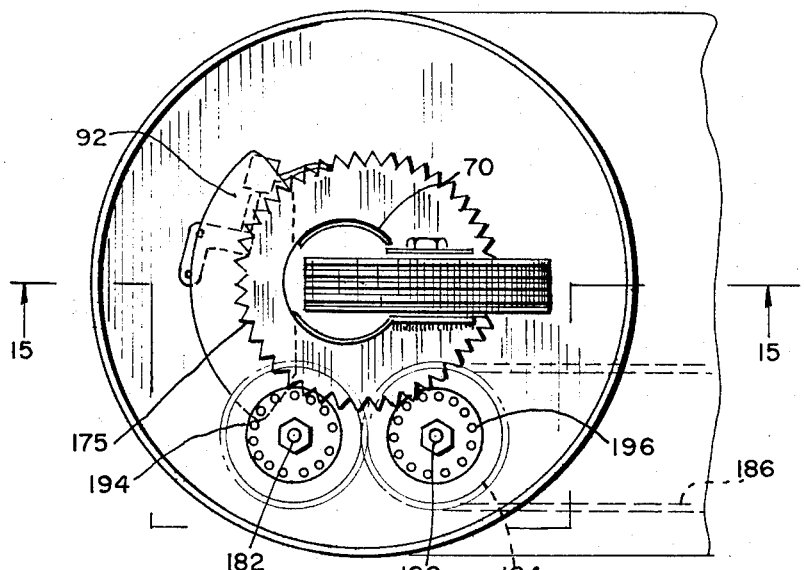
FIG. 14 represents a bottom plan view, partly schematic, in which the power means for swinging the caster is provided by a belt drive from the mower motor which is clutch-connected to a geared drive using a pinion and a curved gear.
Figure 15:
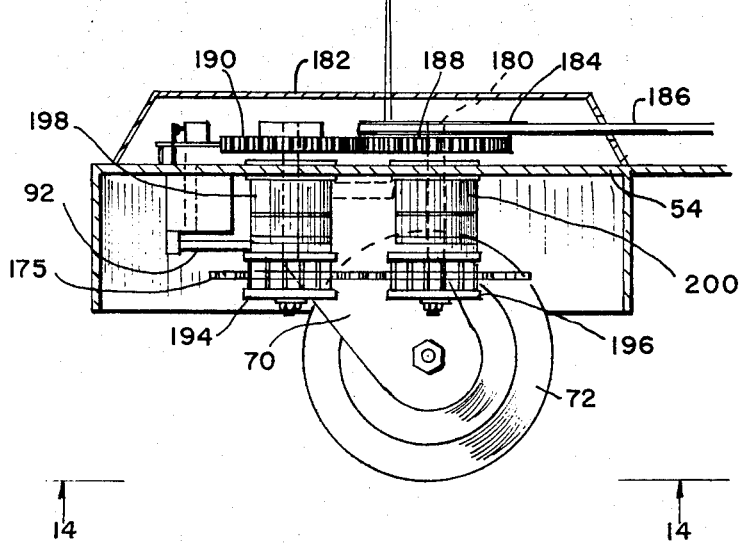
FIG. 15 represents a side or front view showing the drive apparatus of FIG. 14.

Alternate Embodiment of FIGS. 14 and 15

Referring next to FIGS. 14 and 15 there is depicted an alternate embodiment wherein power for effecting the turn of the apparatus is derived from the crank shaft of the mower motor. This motor may be a motor 24 as shown in FIGS. 1 and 2. The caster wheel 72 carried by frame 70 and supported by platform 54 is substantially identical in all respects to that in FIGS. 1 through 9 with the exception that instead of a circular squirrel-cage gear as depicted in FIGS. 3, 6 and 7 there is carried on the caster frame 70 a plate-type spur gear 175. This plate-type gear 175 is secured to the frame 70 by welding or by a bracket and is movable therewith. Carried on the platform 54 are two vertical shafts 180 and 182 and on the upper end of the shaft 180 is a V-belt sheave 184 which is driven by a V-belt 186 operationally connected to a sheave (not shown) and driven by the motor 24. Shaft 182 is connected to shaft 180 by means of spur gears 188 and 190 of like size and pitch. These gears are meshed with each other so as to be rotated simultaneously and in counter turning directions. These shafts extend through plate 54 and carry on their lower ends squirrel- or cage-type pinions 194 and 196 similar in construction to that seen in FIGS. 7 and 8 except that these squirrel- or cage-type pinions are vertically disposed. Clutches 198 and 200 are similar to clutches 78 and 79 and when engaged are disposed to selectively rotate the adjacent squirrel-type pinion carried on this common shaft.

Use and Operation of the Embodiment of FIGS. 14 and 15

In operation the V-belt 186 is driven by means of the motor 24 to which it is connected by a pulley carried on the motor crank or drive shaft and as the belt 186 is driven it causes pulley 184 to be rotated. Rotation of this pulley drives shaft 180 and secured gear 188 carried thereon. As gear 188 is rotated the like-sized spur gear 190 is rotated in the same direction as gear 190. With the closing of a switch to cause either clutch 198 or clutch 200 to be energized the adjacent cage-type pinion is operationally connected to the shaft and is rotated. As the rotated pinion is in engagement and mesh with the plate gear 175 it rotates the gear and causes the caster frame 70 to be swung to a determined turn condition which condition, of course, is limited by means and controls substantially identical to those shown in FIGS. 1 through 5 and the block diagram of FIG. 11.

Figure 16:
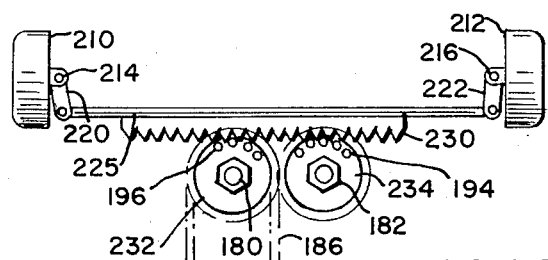
FIG. 16 represents a fragmentary, partly schematic, plan view of a steering control for a four-wheeled apparatus.

Alternate Embodiment of FIG. 16 Employing a Drive Similar to that of FIGS. 14 and 15

Referring next to FIG. 16 it is to be noted that the mechanical drive coupling the motor 24 of the mower to the steering function as seen in FIGS. 14 and 15 may be translated to a four-wheel riding-type or other mower in which the non-driven wheels 210 and 212 are carried on pivoted spindles 214 and 216. In the manner of the turn wheels on an automobile the wheel spindles have their vertical pivot members connected and secured to arm members 220 and 222. These arms are pivotally connected to a tie rod 225 at the ends of these extending arms. Carried by and on this tie rod is a straight rack gear 230 which is engaged by and in mesh with squirrel- or cage-type pinions 194 and 196. These pinions are driven by means of clutches and shaft combinations such as depicted in FIGS. 14 and 15. In this embodiment of FIG. 16 a sheave 184 is driven by a V-belt 186 to drive spur gears 188 and 190. Shafts 180 and 182 carry clutches 200 and 198 to drive pinions 194 and 196. These pinions are the same pinions as depicted in FIG. 15 and by means of the control circuit of FIG. 11 and stops appropriately placed limit the movement of the tie rod 225.

The diagrammatic representation of FIG. 16 contemplates that a straight ahead movement will have a mechanical holding means which normally is operatively connected to the tie rod 225 or the rack gear 230 during the normal movement of the mower. This holding means may use a spring-biased solenoid which when actuated releases a locking pin from said holding condition.

Although, not shown, in an alternate arrangement wheels 210 and 212 may be carried by caster-type frames like frame 70 (FIG. 3), which caster frames would have their vertical pivot pins fastened to like link arms, which arms would be constructionally like arms 220 and 222, above-described. These link arms would be connected by tie rod 225 which would carry rack gear 230 and by the driven rotation of cage-type pinions 194 and 196 as in FIGS. 14 and 15 this rack is moved in response to a remote control signal. Rotation of one or the other pinions 194 or 196 moves the swivel-type wheels to a desired turn condition.

Figure 17:
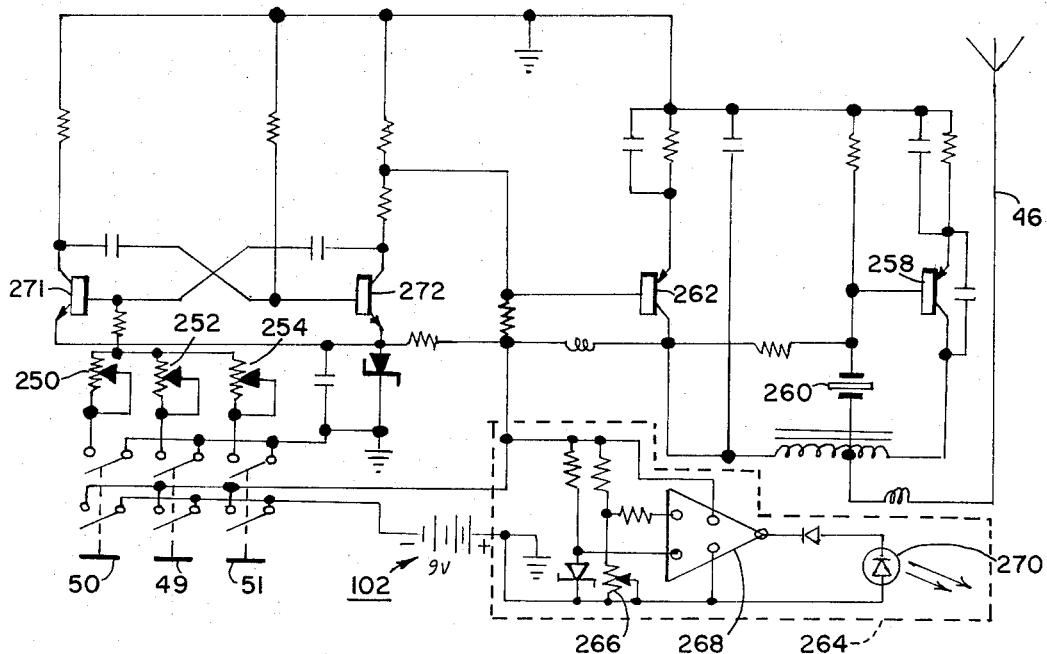
FIGS. 17 and 18 represent the circuit diagrams showing preferred electrical circuits for the remote control transmitter and receiver of the self-propelled apparatus.

Remote Control Radio Transmitter Circuit Diagram of FIG. 17

The remote control radio transmitter as depicted in FIG. 1 is generally indicated as 48. The circuit for this radio transmitter is seen in FIG. 17. This transmitter sends the electromagnetic wave command signals right turn, left turn or stop singularly via a single transmitter receiver channel. Each command modulates the carrier signal with its particular coded frequency. Right- or left-turn command switches 50 and 49 carried by the transmitter case are manually depressed for the period of time the turn function is desired. When this manual pressure is released the lawn mower circuit actuates the swivel caster control to automatically initiate straightening the caster, above-described.

The right-turn command frequency is controlled by resistor 250 when the right-turn command switch 50 is closed. This switch also has a second pole which when closed provides connection to battery 102 to power the entire circuit. The left-turn command frequency is controlled by resistor 252 when the left-turn command switch 49 is closed. Additionally this switch has a second pole which provides a connection to the battery 102 and powers the entire circuit when closed. The stop command frequency is controlled by resistor 254 when the stop command switch 51 is closed. This switch like the two switches which provide the turn functions has a second pole which when closed provides a connection of the battery 102 to the entire circuit.

This radio transmitter provides the radio frequency carrier by means of transistor 258, this frequency being controlled and set by means of a crystal 260. The particular command frequency of the multivibrator formed with transistors 271 and 272 modulates the radio frequency carrier of the transmitter by means of transistor 262. Preferably the battery condition is monitored by a battery monitor circuit 264 enclosed within the dashed outline. When the battery voltage falls below a preset level set by resistor 266 the operational amplifier 268 causes light source 270 to be actuated which emits light from LED 270 thereby giving a battery replacement or "charge battery" indication to the operator of the transmitter.

Figure 18:
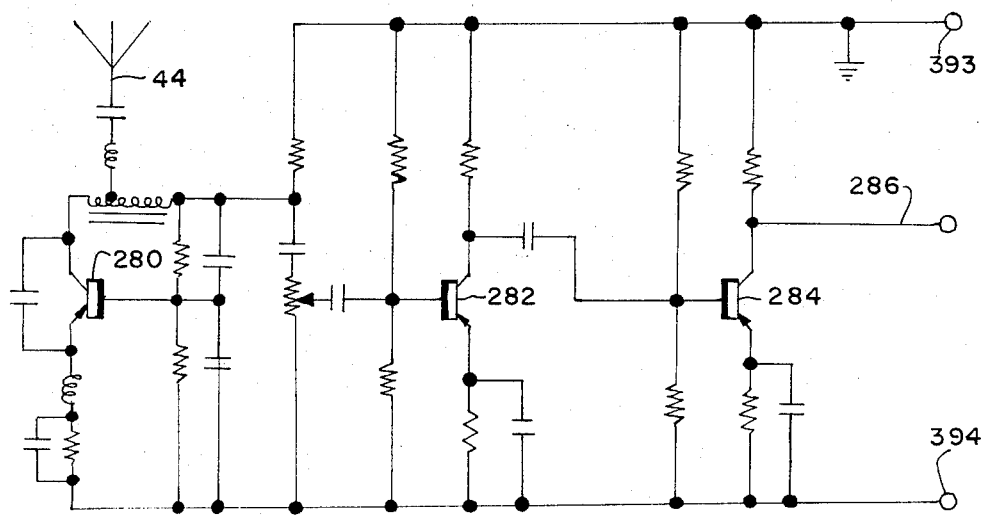

Radio Receiver Circuit of FIG. 18

The remote control radio receiver 101 as depicted in FIG. 18 is carried by and on the circuit board above-identified as 100. Antenna 44 receives the radio frequency signal transmitted by the transmitter 48 and conducts this signal to the receiver circuit of FIG. 18. By means of transistor 280 the received modulated radio frequency signal is demodulated. The demodulated frequency is one of the three command frequencies sent by the remote control transmitter. Transistors 282 and 284 provide the amplification of the command signals to output line 286. This output is the input to the frequency selective amplifiers providing the left, right and stop channels respectively.

Electronic Circuit Diagram of FIG. 19

Referring finally to FIG. 19, there is shown a preferred electronic circuit which is used in conjunction with the block diagram of FIG. 11. As depicted, the radio signal from receiver output 286 is amplified by transistors 290, 291 and 292. These amplified signals are filtered by conventional resonant filters 295-296; 298-299 and 301-302. After filtering these signals are respectively rectified by transistors 304, 305 and 306. The direct current voltage is amplified by transistors 308-309-310; 312-313-314 and 316-317-318. This amplified voltage activates relays 320, 321 and 322. Channel activation of relays 320 and 321 is selected by installation switch 121 which provides the power switches output.

The logic equation for energizing left- and right-turn electric clutches 78 and 79 and hold solenoid 96 are as follows:

Left turn = $A_L \bar{B} + \bar{A}_R B_R$
Right turn = $A_R \bar{B} + \bar{A}_L B_L$
Hold turn = $A_L B_L + A_R B_R$ where:

$A_L$ = Relay (320) contact to (330). Left-turn command received.

$A_R$ = Relay (321) contact to (332). Right-turn command received.

B = Switch (108) contacts to (334) & (336). The caster wheel position is *not* at either right or left maximum determined turn angle.

$B_L$ = Switch (110) contacts to (338) & (340). The caster wheel position is at or near the maximum determined left turn position.

$B_R$ = Switch (106) contacts to (342) & (344). The caster wheel position is at or near the maximum right turn position.

A description of the above equations is as follows.

The left turn clutch is energized if the left turn command is received ($A_L$) *and* the maximum determined right or left turn angle has not been reached ($\bar{B}$) *or* the caster wheel is at or near the maximum determined right turn position ($B_R$) and the right turn command is not received ($\bar{A}_R$).

The right turn clutch is energized if the right turn command is received ($A_R$) *and* the maximum determined right or left turn angle has not been reached ($\bar{B}$) *or* the caster wheel is at or near the maximum determined left turn position ($B_L$) *and* the left turn command is not received.

The hold turn solenoid is activated when a right ($A_R$) turn command is received *and* the caster wheel is at or near the maximum determined right turn position ($B_R$) *or* a left ($A_L$) turn command is received *and* the caster wheel is at or near the maximum determined left turn position ($B_L$).

Switches 35 and 34 normally mounted on the mower handle provide power steering when the mower is operated manually. When depressed the switches activate the respective power switch by applying a direct current voltage to transistors 308 and 312.

Zener diode 346 and transistor 348 provide the means for a regulated voltage to the receiver and frequency selective amplifiers, thereby providing stable gain independent of the battery 102 voltage variation.

The battery condition is monitored by the battery monitor circuit 264 shown in dotted area. When the battery voltage falls below a preset level set by resistor 366 operational amplifier 368 activates light source 370 which then emits light thereby giving battery charge or battery replacement indication.

The battery 102 is connected to the receiver circuitry by means of switch 350.

Switch 121, set as shown, provides for left- and right-turn responses from transmitter 48 commands when the arrangement is as in FIG. 1. Switch 121 is set opposite, as shown, when the arrangement is as in FIG. 2.

It is to be noted that the inventive concept includes providing a power wheel which may be a single wheel driven by the motor. In combination with this wheel are outboard wheels which act in concert with the drive wheel to support one end of the apparatus while the other end is supported by one of the steering wheel systems above-described. It is to be further noted that the turning apparatus minus the radio transmitter and receiver may be used with the two turn switches 34 and 35 to provide an inexpensive power steering for a walking or riding mower, snow blower, etc.

It is to be further noted that the inventive concept also recognizes that instead of the pinion and gear shown and described, the powering of the turn of the caster wheel may be by means of a roller chain and sprockets or by a V-belt and sheaves. Gear and pinion arrangements are also contemplated in which both are carried by and on the platform and in response to their actuation, link means operatively connected to the caster wheel frame moves this frame. Such means includes arm links and cam track systems.

Terms such as "left", "right", "up", "down", "bottom", "top", "front", "back", "in", "out", "clockwise", "counterclockwise" and the like are applicable to the embodiments shown and described in conjunction with the drawings. These terms are merely for the purposes of description and do not necessarily apply to the position in which the remote controlled self-propelled apparatus may be constructed or used.

While a particular embodiment of the apparatus as mounted on a lawn mower and alternate embodiments thereof have been shown and described it is to be understood the invention is not limited thereto since modifications may be made within the scope of the accompanying claims and protection is sought to the broadest extent the prior art allows.

What is claimed is:

1. Apparatus for controlling the operational functions of a self-propelled machine said apparatus including: (a) a self-propelled machine having at least one powered wheel driven by a self-contained motor means; (b) at least one non-powered wheel carried by a wheel frame rotatably mounted on a platform portion of the apparatus, said frame being operatively connected to a turn sensing means which as the wheel frame is turned causes the sensing means to be actuated; (c) a driver and driven means, one of which is carried by the platform and the other is carried by the wheel frame so as to move therewith; (d) at least two switch controls adapted to send signals corresponding to right and left operational commands when said switches are actuated; (e) electronic means for receiving a signal from said switch controls and to actuate the drive and driven means to provide a turning actuation for following an arbitrary course as selected by the operator, said actuation being imposed on the wheel frame and mounted wheel to cause said frame to be moved in a prescribed direction; (f) means to limit and maintain the turn angle of the non-powered wheel and frame in its right and left swings from a normal straight ahead direction and where desired for holding said turn to make a completely circular course which may include a plurality of circular patterns, and (g) means for returning the non-powered wheel to its straight ahead condition as and when said turn signal is terminated.

2. Control apparatus for a self-propelled machine as in claim 1 in which the driver and driven means is a pinion and gear, which means when actuated provides pinion rotation relative to the gear.

3. Control apparatus for a self-propelled machine as in claim 1 in which the switch controls also include a radio transmitter of limited range and having at least three switches controlled functions adapted to send radio frequency signals corresponding to right, left and stop commands and in which the electronic means for receiving the signals includes a radio receiver carried by the self-propelled machine, said receiver adapted to receive the radio signal from the transmitter and to demodulate said signal so as to initiate means to perform the desired functional control.

4. Control apparatus for a self-propelled machine as in claim 1 in which at least one non-powered wheel and wheel frame is a swivel caster apparatus and in which there is operatively associated a movable cam, said cam as it is moved by the caster toward and to a maximum turn engaging a limiting switch to provide a turn hold disposed to restrict further turning and to continue this hold action until the turn control signal is terminated.

5. Control apparatus for a self-propelled machine as in claim 4 in which the electrical functional controls are responsive to a logic as follows:

Left turn = $A_L \bar{B}$
Right turn = $A_R \bar{B}$ where:
$A_L$ = Left turn command is received by the command receiving means.
$A_R$ = Right turn command is received by the command receiving means.
$\bar{B}$ = A switch means which determines that the caster wheel is not at either right or left maximum turn angle.

6. Control apparatus for a self-propelled machine as in claim 4 in which the electrical functional controls are responsive to a logic as follows:

Left turn = $A_L \bar{B} + \bar{A}_R B_R$
Right turn = $A_R \bar{B} + \bar{A}_L B_L$
Hold turn = $A_L B + A_R B = B(A_L + A_R)$ where:
$A_L$ = left turn command is received by the command receiving means;
$A_R$ = right turn command is received by the command receiving means;
$\bar{B}$ = a switch means which determines that the caster wheel is not at either right or left maximum turn angle;
$B_L$ = the caster wheel is within a predetermined arc about its vertical axis, extending from the maximum left turning angle to the predetermined angle to the left of the straight ahead position as set by a switch, and
$B_R$ = the caster wheel position is within a predetermined arc about its vertical axis, extending from the maximum right turning angle to the predetermined angle to the right of the straight ahead position as set by a switch.

7. Control apparatus for a self-propelled machine as in claim 4 in which the electrical functional controls are responsive to a logic as follows:

Left turn = $A_L \bar{B} + \bar{A}_R B_R$
Right turn = $A_R \bar{B} + \bar{A}_L B_L$ where:
Left turn = Caster wheel is rotated about its vertical axis by the left turn means to cause the apparatus to turn toward the left.
Right turn = Caster wheel is rotated about its vertical axis by the right turn means to cause the apparatus to turn toward the right.
$A_L$ = Left turn command is received by the command receiving means.
$\bar{B}$ = A switch means which determines the caster wheel is not at either right or left maximum turn angle.
$\bar{A}_L$ = Left turn command is not received by the command receiving means.
$A_R$ = Right turn command is received by the command receiving means.
$\bar{A}_R$ = Right turn command is not received by the command receiving means.

8. Control apparatus for a self-propelled machine as in claim 1 in which the machine includes a pair of handles, each handle having a contact switch connected to the electronic control circuit, one of said switches when closed causing a right turn command to be fed to the apparatus until the switch signal is terminated and the other switch, when closed, causes a left turn command to be fed to the apparatus until the switch signal is terminated.

9. Control apparatus for a self-propelled machine as in claim 1 in which the machine is arranged for power steering and in the actuation thereof the two switches for the left and right commands are arranged to feed selective signals to the electronic control circuit, a first switch when actuated causing a right turn command to be fed to the apparatus resulting in a right turn of the non-powered wheel frame to be made, the turning of the wheel frame when reaching a determined turn angle limit causing a turn hold to be actuated until the signal is terminated and a second switch when actuated causing a left turn command to be fed to the apparatus and a left turn of the frame to be made, said turning of the wheel frame when reaching a determined turn angle limit causing a turn hold to be actuated until the turn signal is terminated.

10. Control apparatus for a self-propelled machine as in claim 1 which the platform portion and associated functional control apparatus is made as original equipment supplied with and as a part of the originally produced self-propelled machine.

11. The method of controlling a self-propelled machine as in claim 10 in which the driver and driven members are a pinion and gear and in which the turning of the non-powered wheel includes turning the pinion relative to the gear to move the frame retaining the non-powered wheel.

12. The method of controlling a self-propelled machine as in claim 10 in which the control provides a power steering for the machine, the method including arranging a pair of switches for manipulative control by the riding operator and in which closing one switch provides a left-turn signal to be sent and when received to actuate and turn the pinion to cause a left turn to be made and holding said turn until the closing of the switch is terminated and in which closing of the other switch causes a right-turn signal and right turn to be made and terminating said turn when the turn signal is terminated.

13. A method of controlling the functions of a self-propelled machine including the steps of: (a) providing a self-propelled apparatus in which at least one powered wheel is driven by a self-contained motor; (b) attaching and supporting by and on a platform portion carried by said machine, apparatus for receiving functional signals and translating said signals into right-turn and left-turn functions for following an arbitrary course as selected by the operator; (c) arranging and mounting on the frame of said platform at least one non-powered wheel in which a frame portion is rotatably mounted to said platform; (d) sensing the turning of said frame to limit the turn angle of the frame and wheel to a determined angle; (e) turning the non-powered wheel by a driver and driven member means arrangement wherein one member of the arrangement is attached to the platform and the other member is attached to the non-powered wheel frame; (f) sending a functional signal such as right turn and left turn by the closing of a designated switch which is one of a plurality of switches used with said machine; (g) receiving said signal and causing power to be applied to the driven member of the driver and driven members so as to cause the apparatus to turn while said signal is received and for holding said turn when desired to make a completely circular course; (h) limiting by a turn sensing means the maximum turn swing of the non-powered wheel, and (i) returning the non-driven wheel to its straight ahead condition when the turn signal is terminated.

14. The method of controlling a self-propelled machine as in claim 13 in which the non-powered steering wheel is a swivel caster and movable with the frame of said caster is a cam, the method further including the step of positioning at least two switches in way of this cam, one of said switches being actuated when a left turn is made and the other switch being actuated when a right turn is made, these switches when actuated causing a turn hold signal to be established to hold the maximum turn until the functional signal is terminated.

15. The method of controlling a self-propelled machine as in claim 13 in which is included the step of providing a radio transmitter of limited range and having at least three switch-controlled functions adapted to send the functional signals as radio frequency signals, the functional signals corresponding to right, left and stop commands and in which the receiving of these signals includes providing a radio receiver carried by the self-propelled machine and adapting said receiver to receive the radio signal from the transmitter and to demodulate said signal so as to actuate the driven member to perform the desired functional control.

16. A method of controlling the functions of a self-propelled machine including the steps of: (a) providing a self-propelled apparatus in which at least one powered wheel is driven by a self-contained motor; (b) attaching and supporting by and on a platform portion carried by said machine, apparatus for receiving functional signals and translating said signals into right-turn and left-turn functions; (c) arranging and mounting on the frame of said platform at least one non-powered freely rotatably wheel carried by a frame portion which is rotatably mounted as a swivel caster to said platform; (d) mounting a cam so as to be movable with said caster and positioning at least two switches in way of this cam, one of said switches being actuated when a left turn is made and the other switch being actuated when a right turn is made, these switches when actuated causing a turn hold signal to be established to hold the maximum turn until the functional signal is terminated; (e) carrying the non-powered wheel by an axle freely rotatable in the caster wheel frame, said axle having its end extending beyond the frame of the caster wheel frame; (f) mounting a pair of electric clutches on said extending axle with one clutch being mounted on each side of the frame and causing each clutch to be responsive to one determined turn signal; (g) supporting a pair of pinions on said axle, each pinion carried by and freely rotatable around the axle, one of said pinions being carried adjacent each of the clutches and when a clutch is actuated causing the adjacent pinion to be turned with and by the rotation of the caster axle and positioning and maintaining the axle and supported pinion in continuous cooperative engagement with a gear which is carried by and is secured to a platform portion of the apparatus; (h) sensing the turning of said frame to limit the turn angle of the frame and wheel to a determined angle; (i) sending a functional signal such as right turn and left turn by the closing of a designated switch which is one of a plurality of switches used with said machine; (j) receiving said signal and causing power to be applied to the driven member of the driver and driven members so as to cause the apparatus to turn while said signal is received; (k) limiting by a turn sensing means the maximum turn swing of the non-powered wheel, and (l) returning the non-driven wheel to its straight ahead condition when the turn signal is terminated.

17. The method of controlling a self-propelled machine as in claim 16 which further includes securing to the caster frame a cam plate which is moved with the caster frame as it is swung and pivotally mounting a cam arm on the platform portion of the apparatus and positioning said arm to swing toward and to said cam plate and carrying a cam pin and roller follower on the distal end of the arm so as to engage the path portion of the cam plate and urging said pin and follower by a spring into engagement with said cam path provided by the cam plate, said path including right and left end portions which define a maximum turning radius hold angle of the caster and holding the pin and follower against an end portion of the cam plate until the turn signal is terminated.

18. The method of controlling a self-propelled machine as in claim 16 in which in response to a stop command from the radio transmitter to the radio receiver and demodulated signal causes the further step of actuating an electromagnetic means to cause a grounding of the spark plug of the motor.

19. The method of controlling a self-propelled machine as in claim 16 in which one of the electrical circuits providing the remote and functional control includes the further step of providing an electrical switch adapted to selectively reverse a portion of the circuit so that the signals from the operational command switches corresponding to right- and left-turn signals are reversed, right being left and left being right in the circuit so the correct turn sequence occurs when the mounting condition and operation require the apparatus to be rearwardly mounted while using a forwardly arranged circuit system and vice-versa.

20. The method of controlling a self-propelled machine as in claim 16 which includes the further step of providing a reversible electric motor which is powered by a battery, said motor carrying and rotating a pinion whose direction of rotation and duration of turning is in response to the signals sent from functional control switches.

21. The method of controlling a self-propelled machine as in claim 20 which includes the further step of connecting the output shaft of the electric motor to the pinion through a clutch which is in disengaged condition except when the motor is actuated to turn the pinion in a determined direction.

22. The method of controlling a self-propelled machine as in claim 16 in which the power means to rotate an engaged pinion is a power-transmitting drive such as a V-belt, roller chain and the like, and includes the step of rotating an engaged pinion carried on a shaft rotatably driven by the power-transmitting drive, said shaft carried on said platform with the pinion being driven by said rotating shaft when an electric clutch, also carried by said shaft, is actuated in response to a control signal.

23. The method of controlling a self-propelled machine as in claim 22 in which there are at least two non-powered wheels which with the powered wheels provide a four-wheeled support for the machine, said method including mounting at least two of the non-powered wheels so as to swing in an arc around a vertical axis, operatively connecting these two non-powered wheels to each other with a tie bar arrangement so that they swing in concert with each other, securing a rack-type gear to said tie bar and bring said gear in direct driven engagement with the two pinions and moving the tie bar by the rotation of one of the pinions when this pinion is rotated.

24. The method of controlling a self-propelled machine as in claim 16 in which the machine includes a pair of handles and the method includes the step of mounting on each handle a contact switch connected to the electronic control circuit, one of said switches, when closed, causing a right turn command to be fed to the apparatus until the signal is terminated and the other switch, when closed, causing a left turn command to be fed to the apparatus until this switch signal is terminated.

25. Apparatus for controlling the operational functions of a self-propelled machine, said apparatus including: (a) a self-propelled machine having at least one powered wheel driven by a self-contained motor such as a gasoline engine; (b) at least one non-powered wheel carried by a wheel frame to provide a swivel caster apparatus, this wheel carried by an axle freely rotatable in the caster frame, said axle having a pair of electric clutches carried thereon, one clutch being mounted on each side of the frame and each clutch responsive to a determined turn signal, and two pinions each carried by and freely rotatable around the axle, one of said pinions being carried adjacent each of the clutches, aach clutch having magnetically cooperative means so that when the adjacent clutch is actuated the pinion is turned with and by the rotation of the caster wheel axle, the actuated pinion being in continuous cooperative engagement with a gear which is carried by and secured to a platform portion of the apparatus rotatably mounted on a platform portion of the apparatus, said frame being operatively connected to a turn sensing means which as the wheel frame is turned causes the sensing means to be actuated; (c) a driver and driven means, one of which is carried by the platform and the other is carried by the wheel frame so as to move therewith; (d) at least two switch controls adapted to send signals corresponding to right and left operational commands when said switches are actuated; (e) a movable cam operatively associated with the swivel caster apparatus, said cam as it is moved by the caster toward and to a maximum turn engaging a limiting switch to provide a turn hold disposed to restrict further turning and to continue this hold action until the turn control signal is terminated; (f) electronic means for receiving a signal from said switch controls and to actuate the drive and driven means to provide a turning actuation of the wheel frame and mounted wheel to cause said frame to be moved in a prescribed direction; (g) means to limit and maintain the turn angle of the non-powered wheel and frame in its right and left swings from a normal straight ahead direction, and (h) means for returning the non-powered wheel to its straight ahead condition as and when said turn signal is terminated.

26. Control apparatus for a self-propelled machine as in claim 25 in which the caster frame carries a cam plate which is moved with the caster frame as it is swung and a cam arm is pivotally carried by the platform portion of the apparatus, said cam arm carrying a cam pin and roller follower mounted thereon, said pin and follower being urged by a spring into engagement with a cam path provided on the cam plate, said path including right and left end stop portions each defining a maximum turning radius hold of the caster while the pin and follower are retained against an end stop portion of the cam by an actuated electromagnetic means such as a solenoid which electromagnetic means is deactivated to release the turn hold when the turn signal is terminated.

27. Control apparatus for a self-propelled machine as in claim 25 in which the stop command from the radio transmitter causes the radio received and demodulated signal to actuate an electromagnetic means resulting in a grounding of the spark plug of the gasoline motor.

28. Control apparatus for a self-propelled machine as in claim 25 in which as the maximum turn limit is reached that clutch which is in driving engagement with the engaged pinion is disengaged and when this turn signal command is discontinued the opposite clutch is engaged for a determined period so as to begin a turn of the caster wheel frame toward a normal free-trailing position of the caster wheel, the engagement of the opposite clutch being discontinued before the caster wheel frame reaches its normal free-trailing, straight ahead position.

29. Control apparatus for a self-propelled machine as in claim 25 in which the caster wheel and radio receiver electrical circuit and associated functional control mechanism is carried on a platform which is removably and adjustably mounted to a frame of a conventional self-powered apparatus from which two non-powered wheels at one end of the frame have been removed prior to the attachment of said platform to the apparatus frame.

30. Control apparatus for a self-propelled machine as in claim 29 in which one of the electrical circuits providing the remote and functional control includes an electrical switch means adapted to reverse a portion of the circuit so that the signals from the operational command switches corresponding to right- and left-turn signals are reversed, "right" being "left" and "left" being "right" in the circuit so that the correct turn sense occurs when the mounting condition and operation require the apparatus to be rearwardly mounted while using the forwardly arranged circuit system and vice-versa.

31. Control apparatus for a self-propelled machine as in claim 25 in which the pinion has elongated teeth and the gear is made with inner and outer rings in which, and between which, are mounted equally spaced pins which provide teeth for engagement by the pinion.

32. Control apparatus for a self-propelled machine as in claim 25 in which the gear is circular in configuration and is made with elongated teeth and in which the pinion is made with inner and outer disc-like members with the teeth supplied by equally spaced pins mounted in and extending between disc members.

33. Control apparatus for a self-propelled machine as in claim 25 in which the power means to rotate an engaged pinion is a battery carried by the apparatus and in which said pinion is carried by and is rotated by a reversible electric motor whose direction and duration of turning action is in response to the signals sent from the remote control transmitter.

34. Control apparatus for a self-propelled machine as in claim 33 in which the output shaft of the electric motor is connected to the pinion by and through a clutch which is in disengaged condition except when the motor is actuated to turn the pinion in a determined direction.

35. Control apparatus for a self-propelled machine as in claim 33 in which the electric motor is carried by and on the frame of the caster wheel and is movable therewith while the gear is a circular member fixed to and supported by the platform.

36. Remote control apparatus for a self-propelled machine as in claim 33 in which the electric motor which carries the associated pinion is carried by and on the platform and the mating gear is carried by and on the caster frame and is movable therewith.

37. Control apparatus for a self-propelled machine as in claim 25 in which the power means to rotate an engaged pinion is a power transmitting drive such as a V-belt, roller chain and the like, said transmitting drive being operatively connected to the motor crank shaft of the self-propelled machine, the engaged pinion being carried on a shaft rotatably driven by the transmitting drive, said shaft carried by said platform with the pinion being driven by said rotating shaft when an electric clutch also carried by said shaft is actuated in response to a control signal.

38. Control apparatus for a self-propelled machine as in claim 37 in which there are two pinions, each in engagement with the gear, each pinion carried by one of a pair of shafts which is substantially parallel to each other and which is turned in opposite directions by a pair of meshed gears, one of which is carried on the rotatably driven shaft, each of the shafts having electrically actuated clutches disposed to drive an adjacent pinion carried on said shaft only when said clutch is actuated in response to a turn signal.

39. Control apparatus for a self-propelled machine as in claim 38 in which the gear in engagement with the pinions is carried on the frame portion of a swivel caster assembly and movable therewith.

40. Control apparatus for a self-propelled machine as in claim 38 in which there are two non-powered wheels which with the powered wheels provide a four-wheeled support for the machine, the non-powered wheels each pivotally swingable around a vertical axis, these wheels connected to each other by a tie bar arrangement so that they swing in concert therewith, said tie bar carrying a secured rack-type gear which is in direct engagement with the two pinions and is moved by one of the two pinions when a pinion is turned.

* * * * *

PO-1050 (5/69)

UNITED STATES PATENT OFFICE
CERTIFICATE OF CORRECTION

Patent No. 3,800,902                    Dated April 2nd, 1974

Inventor(s) Richard E. Keller

It is certified that error appears in the above-identified patent and that said Letters Patent are hereby corrected as shown below:

Page 1, Address incorrect - "1645 Valley Ct." should read -- 645 Valley Court --.

Col. 10, line 32, after "occurred" delete colon and add period. Capatalize "This".

Col. 16, line 31, "described" should read -- describes --; line 37, "160 = $A\bar{B} + \bar{A}_R B_R$" should read -- 160 = $A_L \bar{B} + \bar{A}_R B_R$ --;

Col. 16, line 39, "All" should begin a new line.

Col. 19, line 23, "B" should read -- $\bar{B}$ --;
line 38, "and" should be italicized.

In the Claims

Col. 21, line 12, "switches" should read -- switch --;
line 36 and line 38, "is" should be italicized;
line 48, "$A_L B + A_R B = B(A_L + A_R)$" should read -- $A_L B + A_R \mathit{B} = B(A_L + A_R)$ --.

-1-

UNITED STATES PATENT OFFICE
CERTIFICATE OF CORRECTION

PO-1050
(5/69)

Patent No. 3,800,902     Dated April 2nd, 1974

Inventor(s) Richard E. Keller

It is certified that error appears in the above-identified patent and that said Letters Patent are hereby corrected as shown below:

Col. 24, line 11, "end" should read -- ends --.

Col. 25, line 61, "aach" should read -- each --.

Signed and sealed this 17th day of September 1974.

Attest:

McCOY M. GIBSON JR.
Attesting Officer

C. MARSHALL DANN
Commissioner of Patents